United States Patent
Ramaswamy et al.

(10) Patent No.: US 8,953,786 B2
(45) Date of Patent: Feb. 10, 2015

(54) USER INPUT BASED DATA ENCRYPTION

(71) Applicant: Tata Consultancy Services Limited, Mumbai, Maharashtra (IN)

(72) Inventors: Satyanarayanan Ramaswamy, Santa Clara, CA (US); Vadrevu Girija Shankar, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 102 days.

(21) Appl. No.: 13/684,421

(22) Filed: Nov. 23, 2012

(65) Prior Publication Data

US 2014/0064478 A1   Mar. 6, 2014

(30) Foreign Application Priority Data

Aug. 31, 2012   (IN) .......................... 2547/MUM/2012

(51) Int. Cl.
*H04K 1/00* (2006.01)
*H04L 9/28* (2006.01)
*H04L 9/08* (2006.01)
*H04L 9/14* (2006.01)
*H04L 29/06* (2006.01)

(52) U.S. Cl.
CPC . *H04L 9/28* (2013.01); *H04L 63/08* (2013.01); *H04L 9/083* (2013.01); *H04L 9/0863* (2013.01); *H04L 9/14* (2013.01)
USPC ............................................ 380/28; 713/168

(58) Field of Classification Search
CPC ......... H04L 9/28; H04L 9/083; H04L 9/0863; H04L 9/14; H04L 63/08
USPC ................................... 380/28; 713/168; 726/2
See application file for complete search history.

(56) References Cited

U.S. PATENT DOCUMENTS

| | | | |
|---|---|---|---|
| 4,453,074 A * | 6/1984 | Weinstein ........................ 705/66 |
| 6,986,045 B2 * | 1/2006 | Campagna .................... 713/170 |
| 2003/0046572 A1 * | 3/2003 | Newman et al. .............. 713/193 |
| 2007/0245402 A1 * | 10/2007 | Kim ................................. 726/2 |

* cited by examiner

*Primary Examiner* — Samson Lemma
(74) *Attorney, Agent, or Firm* — Hamre, Schumann, Mueller & Larson, P.C.

(57) ABSTRACT

Systems and methods for securing data by a user input based data encryption are described. In one aspect of the invention, the method may include receiving an authentication string from a user to authenticate access to the application. On successful authentication of the user, the data to be secured is obtained from the user. The obtained data is then secured by encryption, which results in generation of a private key. The private key is then associated with the authentication string to form a first secure key. The first secure key is stored with the encrypted data in a data file. The data file is then transferred to a server associated with the application. The data file in the server is further encrypted to generate a second secure key.

14 Claims, 4 Drawing Sheets

USER INPUT BASED DATA ENCRYPTION

TECHNICAL FIELD

The present subject matter relates, in general, to data encryption and, particularly but not exclusively, to user input based data encryption.

BACKGROUND

In today's digital world, a large amount of data is generated, stored and transmitted over communication networks everyday. The data can include confidential information, such as credit card numbers, contact numbers, financial details, personal information, business information, and technical information. Therefore, various methods of data security are used to reduce the possibility of unauthorized data access and usage. Encryption or cryptography is one such method that facilitates in securing the data stored in a system or data in transit. The use of encryption enables conversion of data, such as plain text, in a form, called a ciphertext, which cannot be easily read by an unauthorized user. When required, the ciphertext can be converted to the original plain text by decryption.

Typically, encryption is accomplished through use of a cryptographic algorithm, which is essentially a mathematical function. Commonly used cryptographic algorithms, such as symmetric and asymmetric algorithms require knowledge of variable information called a key to decrypt the ciphertext. These keys are either communicated to the intended recipient through a separate channel or already present with the intended user as private key. The bearer of the private key would be able to decrypt the encrypted data. The bearer needs to take care while handling the private key as there may be attempts to hack the private key thus causing security threat to the encrypted data.

SUMMARY

This summary is provided to introduce concepts related to user input based data encryption and these concepts are further described below in the detailed description. This summary is not intended to identify essential features of the claimed subject matter nor is it intended for use in determining or limiting the scope of the claimed subject matter.

Systems and methods for securing data by a user input based data encryption are described. In one aspect of the invention, the method may include receiving an authentication string from a user to authenticate access to the application. On successful authentication of the user, the data to be secured is obtained from the user. The obtained data is then secured by encryption, which results in generation of a private key. The private key is then associated with the authentication string to form a first secure key. The first secure key is stored with the encrypted data in a data file. The data file is then transferred to a server associated with the application. The data file in the server is further encrypted to generate a second secure key.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of the method(s) in accordance with the present subject matter are described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

Systems and methods for securing data by a user input based encryption are described herein. The systems and methods can be implemented in a variety of communication devices, such as laptops, tablet-computers, servers, databases, and smart phones. Although the description herein is with reference to certain communication devices, the systems and methods may be implemented in other electronic devices, albeit with a few variations, as will be understood by a person skilled in the art. Further, a person skilled in the art will comprehend that the embodiments of the present subject matter are not limited to any particular communication system, architecture or application device, as they may be adapted to take advantage of new computing systems and platforms as they become available.

Conventionally, to secure data, encryption of the data is accomplished by symmetric or asymmetric encryption algorithm mechanisms. The symmetric encryption mechanism involves generation of a single private key that is transferred to a user who wants to access the encrypted information. The asymmetric encryption mechanism involves encrypting the data by a public key and the encrypted data can be decrypted by an intended recipient through a private key corresponding to the public key. However, the above mentioned methods of encryption are slow and suffer from different security oversights. For example, the asymmetric encryption mechanism involves communication between different users to share the private key for the decryption of the encrypted message. Such a communication may take place over a network and may be insecure, which may lead to disclosure of the private key. Furthermore, this practice of communicating the private key over insecure network is prone to data theft and unethical hacking which may compromise the security of encrypted data. In addition, cryptographic algorithms may also come under attack by hackers, such as brute force attack, where a hacker may try all possible combinations of keys for decrypting the secured data.

Different types of the cryptographic algorithms provide varying strengths of data security. The two most popular encryption algorithms are Advanced Encryption Standard (AES) and Rivest, Shamir, and Adleman (RSA). AES is a symmetric algorithm with a fixed key length. RSA is a public key or asymmetric algorithm that can be used for both encryption and digital signatures. DSA (Digital Signature Algorithm) is another popular public key algorithm that is only used for digital signatures. With any of these algorithms, the relative difficulty of breaking an encrypted message by guessing a key with a brute force attack is proportional to the length of the key. For example, if the key is 40 bits long, the total number of possible keys ($2^{40}$) is about 110 billion. Given the computational power of modem computers, this value is often considered inadequate. Further, the risk of private key getting disclosed in transit or getting lost remains and thus it is not a full proof protection.

With the increase in computational capability to generate public-private key match and with increasing threat of data theft and unethical hacking, additional secure encryption mechanisms are being developed for the data protection. As the security in the encryption mechanism is centred around the keys, one of the ways to develop a process with enhanced security is to increase the strength of the keys and to protect the keys against data theft or hacking while the same is in transit or in the system.

In various implementations, system and method for securing data by a user input based encryption is disclosed. The data may be in the form of e-mails, text files, data sheets, spreadsheets, tables, multimedia data, etc. Further, the data may be saved on a communication device, such as a computer, a PDA, a mobile phone, a laptop, a tablet, a server, and a database.

In one embodiment, an application configured on the communication device may be accessed by a user by providing an authentication string. The authentication string may be understood as an input for authenticating the user and allowing access to the application. The authentication string may facilitate in authenticating the user for accessing the application. In one implementation, the authentication string may be login credentials of the user which are used to access the application. Alternatively, the authentication string may be a password for accessing the communication device. In one implementation, the authentication string can be a system generated password.

Once accessed, the user may select data for securing by means of encryption. In an implementation, the user may manually enter the data, such as text in an e-mail application, through the application configured on the communication device for being encrypted. It will be evident that the data to be encrypted may be retrieved from any other storage device, such as flash drive, mobile phone, hard drive, compact disk, servers, and mainframes to the communication device. Alternatively, a data set may be selectively picked from the data for encryption in the communication device. For example, data may be exported from different data files to one common data file by techniques well known in art. Such common data file will contain all the data to be secured by the present subject matter.

Thereafter, the communication device may store the data to be encrypted in a memory thereof. The communication device may encrypt the data that results in generation of a private key. Further, the data may be encrypted using the asymmetric encryption technique. For example, the application may use RSA algorithm to encrypt the data for generating a combination of the public and private key. Alternatively, the encryption can be done by the symmetric encryption technique. In one implementation, the application uses AES symmetric algorithm to encrypt the data.

Furthermore, the private key generated due to encryption is then associated with the authentication string to generate a first secure key in the communication device. In one implementation, the private key is concatenated with the authentication string to generate the first secure key. In another implementation, the private key and the authentication string may be permutated to generate the first secure key. For example, characters of the private key and characters of the authentication string may be linearly combined to form the first secure key. Thereafter, the encrypted data and the first secure key may be stored in a common data file. For example, the first secure key is annexed to the data file containing the encrypted data. Alternatively, the first secure key is merged with the data file containing the encrypted data.

In addition, the data file containing the encrypted data and first secure key is uploaded to a server. The server may be located remotely or locally. Once transferred to the server, the data file is further encrypted for enhancing the security and thereby generating a second secure key. The second secure key may be understood as a private key that may be generated as a result of the RSA encryption algorithm. In one implementation, the second secure key is generated using an asymmetric encryption technique. In another implementation the secure key is generated by symmetric encryption mechanism. Accordingly, the encrypted data file gets stored at the server along with the second secure key.

Further, the encrypted data file may be accessed by a user by means of a device, such as a communication device. The user may provide an input for accessing the server. The input may be user credentials for accessing the server. It will be understood that the user may access the server through the application. Once accessed, the user may provide the second secure key for accessing the encrypted data file. The server may match the second secure key received from the user with the second secure key stored within the server for validating the authenticity of the user. If the second secure key provided by the user matches the second secure key stored in the server, the encrypted data file may be downloaded on the communication device.

As mentioned above, the encrypted data file may include the encrypted data and the first secure key. To decrypt the data, the user may need to provide the first secure key that gets validated with the first secure key stored within the encrypted data file. Upon successful validation, the encrypted data file is decrypted and downloaded to the communication device.

Accordingly, the present subject matter facilitates in protecting data by providing dual encryption of the data. Further, generation of the first secure key by combining the authentication string and the private key may ensure protection of the data from hackers. The present subject matter further provides security against the hacking of the private key from the network which compromises the security of the data. Moreover, the present subject matter ensures that the first secure key does not get lost as well as not easily traceable by hackers in the server as the first secure key and the encrypted data are not located in separate files.

These and other advantages of the present subject matter would be described in greater detail in conjunction with the following figures. While aspects of described systems and methods for user input based encryption can be implemented in any number of different computing systems, environments, and/or configurations, the embodiments are described in the context of the following exemplary system(s).

Figure 1:
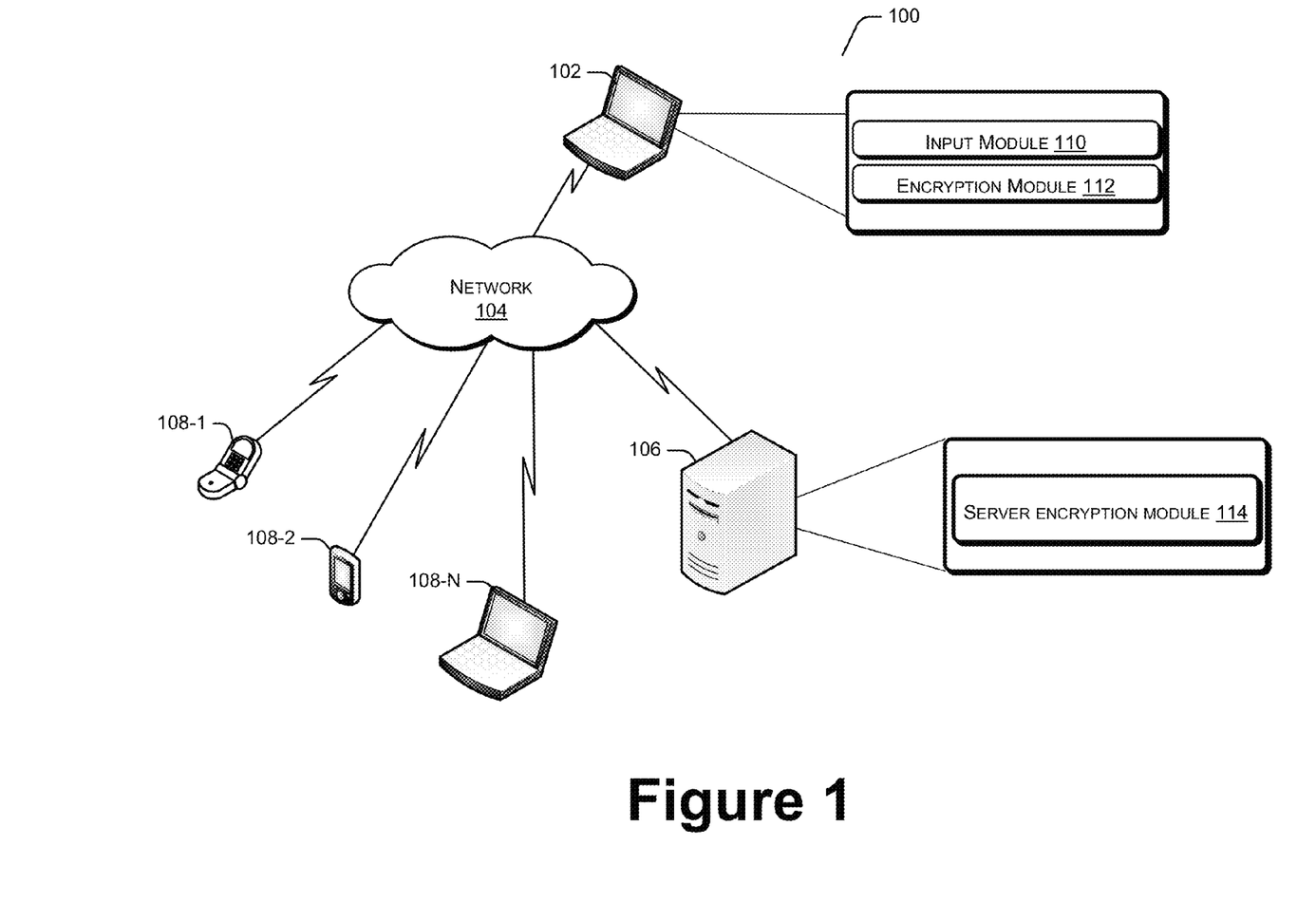
FIG. 1 illustrates a network environment implementation of a user input based data security system, in accordance with an embodiment of the present subject matter.

FIG. 1 illustrates a network environment 100 implementing a data security system 102, in accordance with an embodiment of the present subject matter. In the network environment 100 the data security system 102 is connected to a network 104. Furthermore, a server 106 and one or more communication devices 108-1, 108-2, . . . 108-N, collectively referred as communication devices 108, are also connected to the network 104.

The data security system 102 can be implemented as any computing device connected to the network 104. In one example, the data security system 102 may be implemented as mainframe computers, workstations, personal computers, multiprocessor systems, laptops, network computers, minicomputers, servers, and the like. In addition, the data security system 102 may include multiple servers to perform mirrored tasks for users, thereby relieving congestion or minimizing traffic.

Furthermore, the data security system 102 can be connected to the communication devices 108 through the network 104. Examples of the client devices 108 include, but are not limited to personal computers, smart phones, PDAs, and laptops. Communication links between the communication devices 108 and the data security system 102 are enabled through a desired form of connections, for example, via dial-up modem connections, cable links, digital subscriber lines (DSL), wireless or satellite links, or any other suitable form of communication. In one implementation, the data security system 102 can be provided internal to the communication devices 108. In this manner, the functionality of the data security system 102 can be provided along with the functionality of the communication devices 108.

In one implementation, the data security system 102 may be connected with storage devices, such as flash drives, Hard Drive, phone memory, servers, and mainframes. In another implementation, the data security system 102 may comprise of data received from said storage devices.

Moreover, the network 104 may be a wireless network, a wired network, or a combination thereof. The network 104 can also be an individual network or a collection of many such individual networks interconnected with each other and functioning as a single large network, e.g., the internet or an intranet. The network 104 can be implemented as one of the different types of networks, such as intranet, local area network (LAN), wide area network (WAN), the internet and such. The network 104 may either be a dedicated network or a shared network, which represents an association of the different types of networks that use a variety of protocols, for example, Bluetooth, Hypertext Transfer Protocol (HTTP), Transmission Control Protocol/Internet Protocol (TCP/IP), etc., to communicate with each other. Further, the network 104 may include network devices, such as network switches, hubs, routers, host bus adapters (HBAs), for providing a link between the data security system 102 and the communication devices 108. The network devices within the network 104 may interact with the data security system 102 and the communication devices 108 through communication links.

In one implementation, the data security system 102 may include an input module 110 and an encryption module 112. The input module 110 is configured to receive user input for accessing an application configured on the data security system 102. The user may be authenticated based on an authentication string. In one implementation, the authentication string may be login credentials, such as personal information of the user. In another implementation, the authentication string can be a system generated string provided to the user for authentication. Once accessed, the user may select the data to be secured. In an implementation, the user may manually enter the data into the data security system 102.

Further, the encryption module 112 is configured to encrypt the data in the data security system 102. It will be understood that the data security system 102 may encrypt the data by any of the well known encryption techniques. The encryption of the data may result in generation of a private key. The encryption module 112 may further be configured to generate a first secure key based on a combination of the private key and the authentication string. Additionally, the encrypted data and the first secure key may be saved together in a data file. The data file may then be uploaded to the server 106 for further encryption.

Furthermore, the server 106 includes a server encryption module 114 that may be configured to encrypt the uploaded data file from the data security system 102. The encryption of the data file may lead to generation of another private that may be referred as a second secure key. In one implementation, the encrypted data file and the second secure key is saved in the server 106. Further details regarding data encryption are provided in the detailed description associated with FIG. 2.

Figure 2:
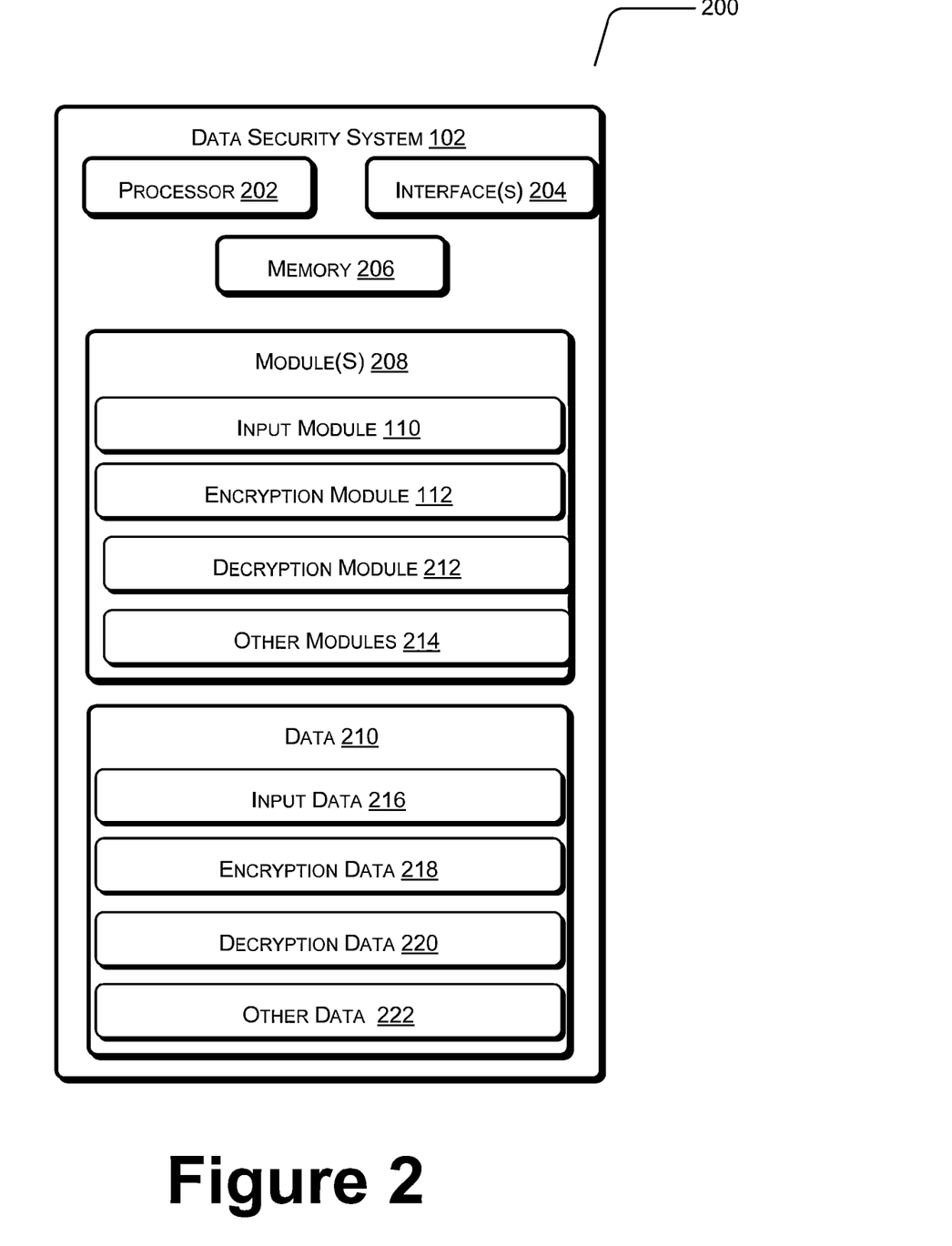
FIG. 2 illustrates a user input based data security system, in accordance with an embodiment of the present subject matter.

FIG. 2 illustrates the data security system 102 for securing data based on user input, in accordance with an embodiment of the present subject matter. In said embodiment, the data security system 102 includes one or more processor(s) 202, interface(s) 204, and a memory 206 coupled to the processor 202. The processor 202 can be a single processing unit or a number of units, and may be implemented as one or more microprocessors, microcomputers, microcontrollers, digital signal processors, central processing units, state machines, logic circuitries, and/or any device that manipulates signals based on operational instructions. Among other capabilities, the processor 202 is configured to fetch and execute computer-readable instructions and data stored in the memory 206.

The interfaces 204 may include a variety of software and hardware interfaces, for example, interface for peripheral device(s), such as a keyboard, keypads, USB interface, a mouse, an external memory, and the like. Further, the interfaces 204 may enable the data security system 102 to communicate with other computing devices, such as the server 106, peripheral devices, web servers and external data repositories, in the network environment 100. The interface(s) 204 may facilitate multiple communications within a wide variety of protocols and networks, such as a network, including wired networks, e.g., LAN, cable, etc., and wireless networks, e.g., WLAN, cellular, satellite, etc. The interface(s) 204 may also include one or more ports for connecting the data security system 102 to a number of computing devices.

The memory 206 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The data security system 102 may further include module(s) 208 and data 210. The module(s) 208 include routines, programs, objects, components, data structures, etc., which perform particular tasks or implement particular abstract data types. In one implementation, the module(s) 208 includes the input module 110, the encryption module 112, a decryption module 212, and other module(s) 214. The other module(s) 214 may include programs or coded instructions that supplement applications and functions of the data security system 102.

On the other hand, the data 210, inter alia serves as a repository for storing data processed, received, and generated by one or more of the module(s) 208. The data 210 includes for example, input data 216, encryption data 218, decryption data 220, and other data 222. The other data 222 includes data generated as a result of the execution of one or more modules in the module(s) 208.

In an implementation, the input module 110 may be configured to receive input from the user to authenticate the user to the access the application. The input received by the user may be referred as an authentication string. The authentication string may include characters, numerals, letters, and combinations thereof. Once authenticated, the user may access the application and enter the data that needs to be secured. In an implementation, the user may select a data set from different sources. The data security system 102 may use symmetric or asymmetric encryption algorithm for encrypting the data. The input module 110 may also be configured to store the authentication string as input data 216.

Further, the encryption module 112 may be configured to receive data for encryption and to encrypt the same within the communication devices 108. In an implementation, the encryption module 112 may encrypt the data entered or uploaded by the user. For example, the encryption module 112 may encrypt the data entered or uploaded by the user by RSA encryption algorithm. As will be understood, upon encryption, a private key may be generated that may be required for decrypting and accessing the encrypted data. The data security system 102 may provide security to the private key such that the private key may not be retrieved by hackers. Accordingly, the encryption module 112 may associate the private key with the authentication string to generate a first secure key. In one implementation, the private key is concatenated with the authentication string to generate the first secure key. Alternatively, any possible combination of letters, digits or characters used in the authentication string and the private key may be used to generate the first secure key. The first secure key may act as a known string for the encryption algorithm. The known string may be understood as an input provided by the user to an encryption algorithm that may be required for decryption of the data.

In an implementation, the encryption module 112 may store the encrypted data and the first secure key within a data file in the communication devices 108. This may facilitate in securing the first secure key from getting lost or damaged. The encryption module 112 may also be configured to store the first secure key and the second secure key as the encryption data 218. Further, the encryption module 112 may be configured to upload the data file to the server 106.

As mentioned with reference to FIG. 1, the server 106 may include the server encryption module 114. When the data file is uploaded from the communication devices 108 to the server 106, the server encryption module 114 may encrypt the data file to generate another private key. The another private key may be referred as a second secure key. The second secure key may facilitate in decrypting the encrypted data file. It will be evident that the second encryption takes place at the server 106 and therefore the second secure key may also be stored in the server 106.

Further, the decryption module 212 of the data security system 102 may be configured to decrypt the encrypted data file saved on the server 106. The decryption module 212 may authenticate any user who may be trying to access the application. The decryption module 212 may validate the user by comparing the input provided by the user for accessing the application with the input stored in the server 106. After validating the user, the decryption module 212 may send a request to the server for decrypting the encrypted data. The decryption module 212 may receive the second secure key from the user. The second secure key may be validated against the second secure key saved in the server 106. Upon successful validation, the encrypted data file is downloaded to a user device through which the user may be communicating with the server 106. it will be evident to a person skilled in the art that the user device is a communication device 108. As mentioned above, the encrypted data file is received by the user device upon successful validation of the second secure key.

As described above, the encrypted data file so downloaded may include encrypted data and the first secure key. The encrypted data in the data file may then be decrypted using the first secure key. The user therefore provides the first secure key, which is a combination of the authentication string and the private key. The decryption module 212 may also be configured to store the decrypted content as decrypted data 220 on the user device.

A person skilled in art would readily understand that the encryption module 112 and the decryption module 212 can be executed by two different users on different devices. For example, a first user may encrypt a first data file using the encryption module 112 and a second user may decrypt a second data file involving the decryption module 212 at the same time. Further, the present subject matter facilitates in securing the data as well as the private keys by combining the private key with the authentication string.

Figure 3:
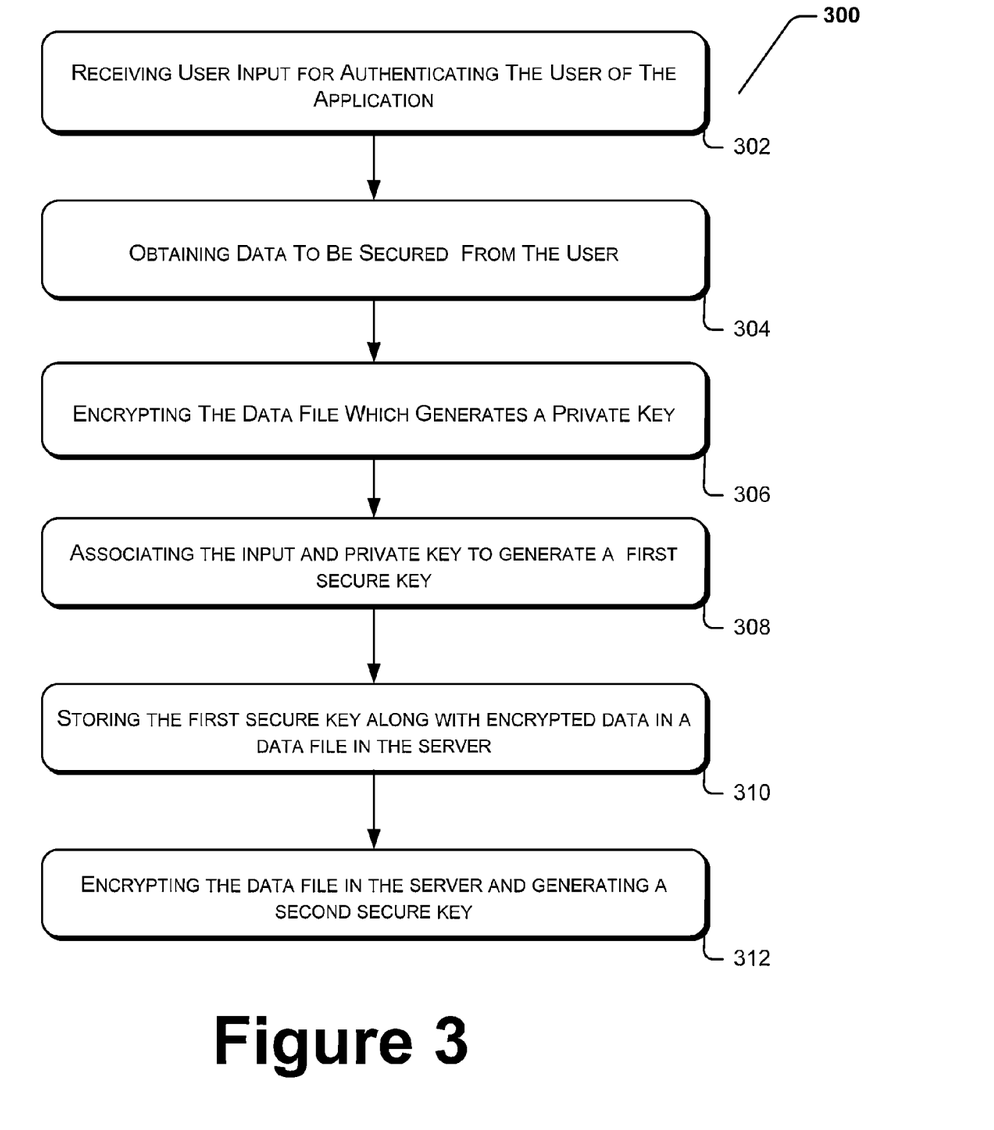
FIG. 3 illustrates a method for user input based data encryption while uploading the encrypted data in the server, in accordance with an embodiment of the present subject matter.

FIG. 3 illustrates a method 300 for securing data by a user based encryption, in accordance with an embodiment of the present subject matter. The method 300 may be implemented in a variety of computing systems in several different ways. For example, the method 300, described herein, may be implemented using the data security system 102 and the server 106, as described above.

The method 300, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 300.

The order in which the method 300 is described is not intended to be construed as a limitation, and any number of the described method blocks can be combined in any order to implement the method, or an alternative method. Additionally, some of the individual blocks may be deleted from the method without departing from the spirit and scope of the subject matter described herein. Furthermore, the methods can be implemented in any suitable hardware, software, firmware, or combination thereof. It will be understood that even though the method 300 is described with reference to the communication devices 108 and the server 106, the description may be extended to other systems as well.

At block 302, an input is received, for example, by the input module 110, from a user for authenticating the user of the application. The input may be referred as an authentication string. The authentication string may facilitate the user to access the application configured on a user device. In one implementation, the authentication string may be saved in the application to access the application. Alternatively, the authentication string may be provided to the user by a string generated by the data security system 102. The authentication string may also be a text string selected by the user and consisting of letters, characters, digits and such other alternatives as readily understood by the person skilled in the art.

Upon successful authentication of the user, the user may access the application. At block 304, data to be secured is obtained from the user, for example, by the input module 110. In one implementation, the user may manually enter the data into the application. Alternatively, the data can be selected from several data files saved in the memory 206 of the data security system 102. In one implementation, the data can be acquired from various other memory devices that may be connected to the data security system 102. For example, the memory devices, such as flash drives, hard drives, mobile phones with memory, compact disk, tablets, smart phones, mainframes, and servers may be used to transfer the data to the data security system 102.

At block 306, the selected data is encrypted in the data security system 102 using the encryption module 112. The encryption of the data leads to generation of a private key. In one implementation, the encryption of the data is done using asymmetric encryption technique. In another implementation, the encryption is done using symmetric encryption technique. In one implementation, encryption of data happens from a batch of different data files from where the data is exported to a common data file for encryption. Alternatively, the data from a plurality of files can be merged in one data file.

At block 308, the private key may be associated with the authentication string to generate a first secure key. The first secure key may act as a known string for the encryption algorithm. The private key may be concatenated with the authentication string provided by the user to generate the first secure key. Alternatively, the characters used in authentication string can be combined with the characters of generated private key to generate the first secure key.

At block 310, the encrypted data and the first secure key may be stored in a data file by the encryption module 112. The data file containing the encrypted data and first secure key may then be uploaded to the server 106.

At block 312, the data file uploaded to the server 106 may further be encrypted to generate a second secure key. The second secure key may be understood as a private key for decrypting the encrypted data file. In one implementation, the second secure key may be generated through symmetric encryption algorithm. In another implementation, the secure key is generated by an asymmetric encryption algorithm. The encrypted data file along with the second secure key is thereafter saved in the server 106.

Figure 4:
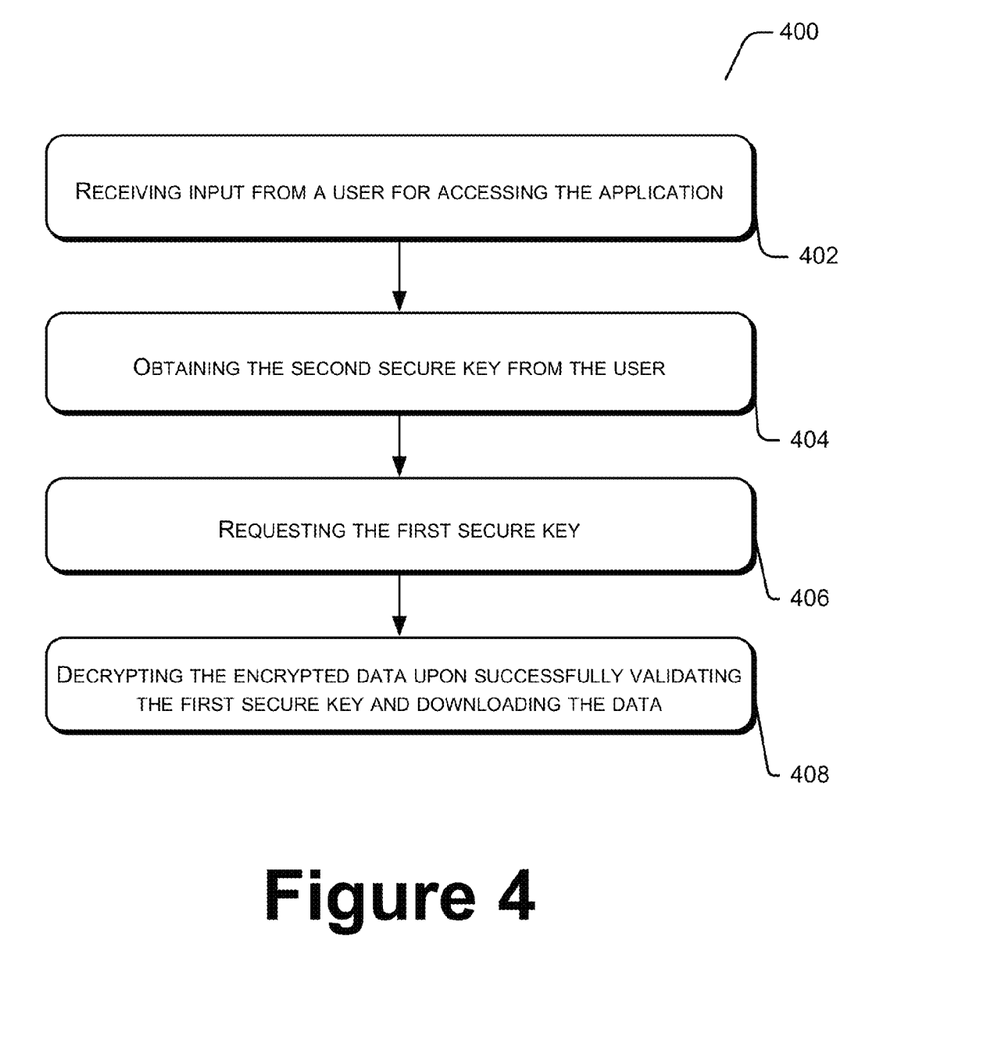
FIG. 4 illustrates a method for decrypting data secured by the user input based encryption, in accordance with an embodiment of the present subject matter.

FIG. 4 illustrates a method 400 for retrieving data stored on a server 106, in accordance to one embodiment of the present subject matter. The method 400 may be implemented in a variety of computing systems in several different ways. For example, the method 400, described herein, may be implemented using the data security system 102, as described above.

The method 400, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 400.

The order in which the method 400 is described is not intended to be construed as a limitation, and any number of the described method blocks can be combined in any order to implement the method, or an alternative method. Additionally, some of the individual blocks may be deleted from the method without departing from the spirit and scope of the subject matter described herein. Furthermore, the methods can be implemented in any suitable hardware, software, firmware, or combination thereof. It will be understood that even though the method 400 is described with reference to the data security system 102 and the server 106, the description may be extended to other systems as well.

It will be evident to a person skilled in art that though the method described herein is referenced generally to the data security system 102, it can be equally extended to any other device physically different or remotely located from the data security system 102 wherein the encryption and uploading of data to the server 106 happened. For example, the method 400 described herein can be implemented in the device distinctly located from the data security system 102. Person skilled in art would further recognise that any device with the modules 208 configured are capable for both the methods 300 and 400 described herein and can be used based on specific situations.

At block 402, input from a user may be received for authenticating the user. As mentioned with respect to FIG. 3, the input module 110 may be configured to receive the input. Further, the user may be authenticated for accessing a server 106. It will be understood that the server 106 may be an application server.

At block 404, the second secure key may be obtained from the user by the input module 110. The input module 110 may validate the user by comparing the second secure key received by the user with the second secure key stored in the server 106. Upon successful validation, the encrypted data file may be downloaded on a device being used by the user for communicating with the data security system 102.

At block 406, the first secure key may be requested from the user by the decryption module 212. As described earlier, the first secure key may include a combination of the authentication string and the private key. The first secure key provided by the user may be compared with the first secure key stored within the encrypted data file.

At block 408, upon successful validation of the first secure key, the encrypted data file may be decrypted for being downloaded on the user device, such as the communication device 108.

Although implementations of systems and methods for user input based encryption have been described in language specific to structural features and/or methods, it is to be understood that the appended claims are not necessarily limited to the specific features or methods described. Rather, the specific features and methods are disclosed as example implementations of the systems and methods for user input based encryption.

We claim:

1. A method, implemented by a microprocessor, for securing data, the method comprising:
   receiving an authentication string as input from a user for authenticating the user to access an application;
   obtaining, upon authentication, the data from the user for securing the data, wherein the securing comprises encrypting the data, the encryption generates encrypted data and a private key;
   associating the authentication string with the private key to generate a first secure key;
   storing the encrypted data in a data file, wherein the first secure key is stored along with the encrypted data within the data file; and
   transferring , by the microprocessor, the data file to an application server associated with the application for encrypting the data file, the encryption of the data file generates a second secure key.

2. The method as claimed in claim 1 further comprising decrypting the encrypted data file, wherein the decrypting comprising:
   receiving the second secure key from the user for decrypting the encrypted data file;
   receiving the first secure key for decrypting the encrypted data present in the decrypted data file; and
   downloading the decrypted data.

3. The method as claimed in claim 1, wherein the authentication string comprises login credentials of the user.

4. The method as claimed in claim 1, wherein the associating comprises concatenating the authentication string with the private key to generate the first secure key.

5. The method as claimed in claim 1, wherein the encryption is performed by one of a symmetric and asymmetric encryption techniques.

6. A data security system comprising:
   a processor;
   an input module coupled to the processor, the input module configured to:
      receive an authentication string from a user for authenticating the user to access an application, wherein the application is configured on the data security system; and
      obtain, upon authentication, data to be secured from the user; and
   an encryption module coupled to the processor, the encryption module configured to:
      encrypt the data received from the user, wherein the encryption generates encrypted data and a private key;
      associate the authentication string with the private key to generate a first secure key;
      store the encrypted data in a data file, wherein the first secure key is stored along with the encrypted data within the data file; and
      transfer the data file to an application server associated with the application for encrypting the data file, the encryption of the data file generates a second secure key.

7. The data security system as claimed in claim 6 further comprising a decryption module coupled to the processor, the decryption module configured to:
   receive the second secure key as user input to authenticate the user, wherein successful authentication results in decryption of the data file;
   download the decrypted data file; and
   decrypt the data in the decrypted data file by providing the first secure key.

8. The data security system as claimed in claim 7, wherein the decryption module is also configured to authenticate the user for accessing the application server using login credentials.

9. The data security system as claimed in claim 6, wherein the encryption module is configured to associate by means of concatenating the authentication string with the private key to generate the first secure key.

10. A non-transitory computer-readable medium having embodied thereon a computer program for executing a method comprising:
   receiving an authentication string as input from a user for authenticating the user to access an application;
   obtaining, upon authentication, data from the user for securing the data, wherein the securing comprises encrypting the data, the encryption generates encrypted data and a private key;
   associating the authentication string with the private key to generate a first secure key;
   storing the encrypted data in a data file, wherein the first secure key is stored along with the encrypted data within the data file; and
   transferring the data file to an application server associated with the application for encrypting the data file, the encryption of the data file generates a second secure key.

11. The non-transitory computer-readable medium as claimed in claim 10 further comprising decrypting the encrypted data file, wherein the decrypting comprising:
   receiving the second secure key from the user for decrypting the encrypted data file;
   receiving the first secure key for decrypting the encrypted data present in the decrypted data file; and
   downloading the decrypted data.

12. The non-transitory computer-readable medium as claimed in claim 10, wherein the authentication string comprises login credentials of the user.

13. The non-transitory computer-readable medium as claimed in claim 10, wherein the associating comprises concatenating the authentication string with the private key to generate the first secure key.

14. The non-transitory computer-readable medium as claimed in claim 10, wherein the encryption is performed by one of a symmetric and asymmetric encryption techniques.

* * * * *